United States Patent [19]

McClain

[11] 3,909,677
[45] Sept. 30, 1975

[54] ELECTRICAL DISTRIBUTION NETWORKS INCORPORATING MEANS FOR SECTIONALIZING FAULTED LOAD SECTIONS

[75] Inventor: James E. McClain, Greenville, Tex.

[73] Assignee: Esco Manufacturing Company, Greenville, Tex.

[22] Filed: Mar. 13, 1974

[21] Appl. No.: 450,867

[52] U.S. Cl. .............. 317/29 R; 317/26; 317/31
[51] Int. Cl.² .................................. H02H 7/26
[58] Field of Search .......... 317/28 R, 29 R, 25, 22, 317/60 R, 23, 26; 307/64, 65, 18, 23, 29, 70, 71, 80, 85, 86

[56] References Cited
UNITED STATES PATENTS

| | | | |
|---|---|---|---|
| 1,646,215 | 10/1927 | Place | 307/23 |
| 1,754,027 | 4/1930 | MacLeod et al. | 307/23 |
| 1,955,311 | 4/1934 | Parsons | 317/25 |
| 2,173,673 | 9/1939 | Weichsel | 307/64 |
| 2,383,327 | 8/1945 | Ludwig et al. | 317/25 X |
| 2,942,154 | 6/1960 | Van Ryan | 317/25 X |
| 3,388,297 | 6/1968 | Curtis et al. | 317/29 R X |
| 3,474,256 | 10/1969 | Begent | 307/18 |
| 3,767,934 | 10/1973 | Butcher | 307/64 |

Primary Examiner—J. D. Miller
Assistant Examiner—Patrick R. Salce
Attorney, Agent, or Firm—Kenneth R. Glaser

[57] ABSTRACT

Disclosed are alternate embodiments of a power distribution network having a pair of branches with load sections coupled to each branch, a pair of feeders providing not only the "Preferred" source of power to the load sections of each branch during normal operation, but respectively providing an "Emergency" source of power to a load section of the other branch under certain load fault conditions. An auxiliary emergency power source is additionally provided for each branch, a switching system incorporating a plurality of series connected load break switches and vacuum interrupters automatically controlled for isolating the faulted section and transferring the remaining sections to the respective power sources. One of the embodiments disclosed includes means for preventing such isolation and transference in the event of a temporary or short-term fault.

3 Claims, 3 Drawing Figures

FIG. 1

ELECTRICAL DISTRIBUTION NETWORKS INCORPORATING MEANS FOR SECTIONALIZING FAULTED LOAD SECTIONS

This invention relates to high voltage electrical power distribution networks, and more particularly to electrical power distribution networks having switching systems automatically responsive to respective load section faults for isolating or sectionalizing the faulted load section while providing continuous power to the remaining load sections.

It is a widely known practice in the electrical utility industry to provide electrical distribution networks having both preferred and emergency sources of power which can be responsively switched into and out of connection with the loads associated with the network in the event of loss of voltage or faults occurring therein. Such a network normally includes two power sources (feeders) coupled to the network branches for respectively providing power to load sections associated with each branch during normal operating conditions and, upon the occurrence of a load fault in one of the sections, switching means for transferring the remaining non-faulted loads to one of the power sources, which then constitutes the "emergency" source of power thereto. Since each power source (and its related distribution network) must therefore be capable of assuming essentially twice its normal operating load, a one hundred percent redundancy factor must be incorporated in the design of the equipment. This requirement thus unnecessarily increases the cost, as well as the complexity, of the overall distribution network.

It is therefore a primary object of the invention to provide a new and improved high voltage electrical power distribution network having the capability of isolating or sectionalizing faulted load sections while continuously providing power to the remaining load sections.

It is another object of the invention to provide such an electrical power distribution network which does not require the incorporation of a one hundred percent design redundancy factor in its construction.

It is an even further object of the invention to provide a high voltage electrical power distribution network incorporating a new and improved switching system for automatically responding to load faults for isolating the faulted load section while maintaining power to the remaining sections thereof.

In accordance with these and other objects, the present invention is directed to a power distribution network having a pair of branches with load sections coupled to each branch, a pair of feeders providing not only the "Preferred" source of power to the load sections of each branch during normal operation, but respectively providing an "Emergency" source of power to a load section of the other branch under certain load fault conditions. Uniquely, an auxiliary emergency power source is additionally provided for each branch, a unique switching system incorporating a plurality of series connected load break switches and vacuum interrupters automatically controlled for isolating the faulted section and transferring the remaining sections to the respective power sources. The utilization of the additional auxiliary power sources, and the unique switching systems, avoids the necessity of the one hundred percent design redundancy previously discussed.

Additional features, as well as other objects and advantages, of the invention will become apparent from the following detailed description taken in conjunction with the accompanying drawings, wherein like numerals refer to similar parts, and wherein.

Figure 1:
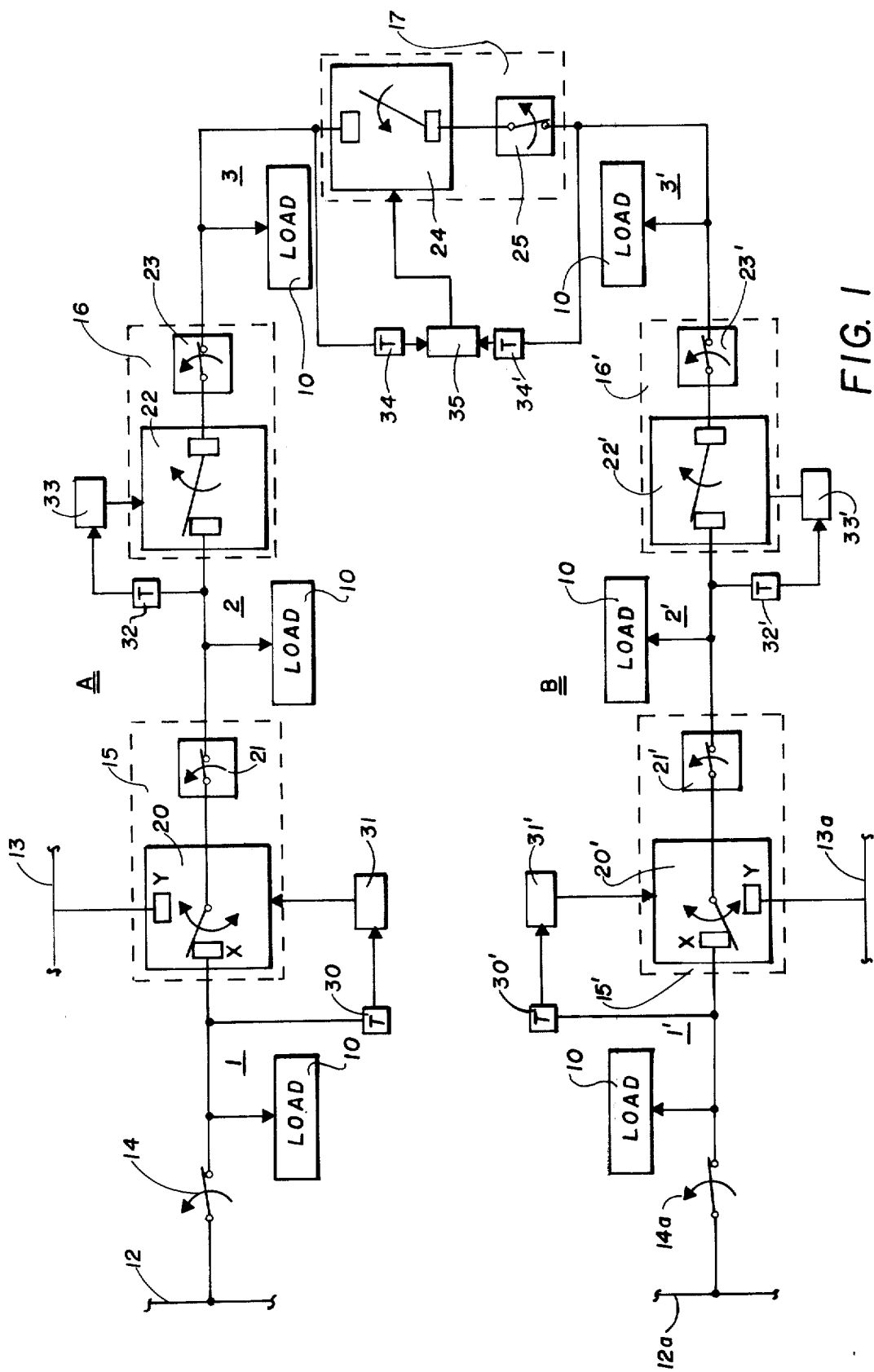
FIG. 1 is a block diagram of a first preferred embodiment of an electrical power distribution system incorporating the principles of the present invention.

Referring now to FIG. 1, there is depicted a first preferred embodiment of a high voltage electrical power distribution network incorporating the principles of the present invention. Accordingly, the distribution network comprises branches A and B respectively coupled at one end (by way of conventional circuit breakers 14 and 14a) to feeder cables 12 and 12a and adapted to be electrically connected, in the manner subsequently described, by a switching system 17. Feeder cables 12 and 12a are respectively connected to electrical power sources (not shown) which normally constitute the major substations of an overall power distribution system. In addition, and in accordance with a unique feature of the present invention, additional power sources (not shown) coupled to feeder cables 13 and 13a are provided to supply power, under prescribed fault conditions, to respective load sections of branches A and B, the feeder cables 13 and 13a respectively adapted for switchable coupling to these branches in the manner subsequently described.

Load sections 1, 2, and 3 (and 1', 2', and 3') are coupled to, and along, the branches of the network, each section comprising a load 10 which typically would be, for example, the utility service entrance of one or more residences or the like. The feeder cable 12 thus constitutes the primary or "Preferred" source of power to the loads associated with branch A during normal operating conditions and, under the specified fault conditions subsequently described, would provide an auxiliary or "Emergency" source to one of the load sections of branch B. Similarly, feeder cable 12a provides the primary or "Preferred" source of power to the load sections of branch B and would provide an "Emergency" source to one of the load sections of branch A. Additionally, the feeder cables 13 and 13a provide additional "Emergency" sources to respective load sections of these two branches during specified load fault conditions.

As depicted in FIG. 1, respective switching systems 15, 15', 16, 16' are disposed between adjacent load sections of each branch; a switching system 17 disposed between the adjacent load sections (3 and 3') of branches A and B. Each of these switching systems is controllably switched between a "normal" position whereby the load sections are being supplied power from their "Preferred" sources (12 or 12a) to respective "faulted" positions for isolating or sectionalizing a load section upon the occurrence of a fault thereat, while power is supplied to the remaining load sections; each switching system comprising two series connected switches, one of the switches being actuated in response to a loss of voltage at its input, the other switch (normally closed) adapted to open in response to excessive current therethrough. The switching system 15 (15') comprises a two-position switch 20 (20') in series with a normally closed switch 21 (21'). The switch has its terminals X and Y respectively coupled to the primary feeder 12 (12a) and the auxiliary feeder 13 (13a), the switch contact being moved from contact with the terminal X to the terminal Y in response to loss of voltage at the input to the switch 20 (20'). This loss of voltage can be sensed by a conventional voltage transformer 30 (30') having its output coupled to a control network 31 (31') for effecting this switching operation. The switch 21 (21') is normally closed and is opened in response to excessive current therethrough.

Switching system 16 (16') comprises a normally closed switch 22 (22') (which is opened in response to loss of voltage at its input) in series with normally closed switch 23 (23') opened in response to excessive current therethrough. The loss of voltage at the input to switch 22 (22') is sensed by a voltage transformer 32 (32') having its output coupled to a control network 33 (33') for effecting the opening of the switch.

Switching system 17 comprises a normally open switch 24 adapted to be closed in response to a loss of voltage at either input to the system 17, these loss of voltage conditions being sensed by voltage transformers 34 and 34' having their respective outputs coupled to a control network 35 for effecting this closing operation. A normally closed switch 25 in series with the switch 24 is normally closed and adapted to be opened in response to excessive current therethrough.

Each of the switches 20–23 (20'–23'), 24, and 25 may be of any type conventionally known in the art. In accordance with a preferred form of the invention, however, the switches 20(20'), 22(22'), and 24 are "load break oil switches"; and switches 21 (21'), 23 (23'), and 25 are "vacuum interrupters", manufactured and distributed, for example, by the Esco Manufacturing Company of Greenville, Tex., the assignee hereof.

There is now described the overall operation of the distribution network depicted in FIG. 1, illustrating the sectionalizing or isolation of a load section from the remainder of the network as a consequence of a load fault therein and the transfer of the non-faulted load sections from the preferred to emergency sources. For convenience of description, the following operating sequence is referenced to faults occurring within the various load sections associated with one of the branches, for example branch A, it being understood that a similar operating sequence would occur for load faults in corresponding load sections of branch B.

terminal position. The corresponding switches in branch B would, of course, be in the same position. Thus, power to all the load sections 1, 2, and 3 is being supplied from the primary feeder 12.

Assume now that a fault occurs at the load section 1. As a consequence thereof, the resulting over-current opens circuit breaker 14, resulting in the consequent loss of voltage at the inputs to load break switches 20, 22, and 17. As a consequence, the load break switch 20 (switch contact) would be switched to the Y terminal position; the switch 22 would open; and switch 17 would close. Thus, the load section 2 is now coupled to, and furnished power from, the auxiliary feeder cable 13; load section 3 is coupled to, and being furnished power from, the feeder cable 12a; and the faulted load section 1 has been isolated or sectionalized from the remainder of the network.

On the other hand, assume that the load fault initially occurred at the load section 2. As a consequence, the resulting over-current would open the vacuum interrupter 21, thus resulting in a loss of voltage at the input to the load break switches 22 and 17. As a consequence, load break switch 22 would open and load break switch 17 would close. Thus, load section 1 is fed from feeder cable 12; load section 3 is fed from the cable 12a; and faulted section 2 is isolated.

And finally, assume that a fault occurs at load section 3 when the system is under its normal operating conditions. Thus, as a consequence of this fault, the vacuum interrupter 23 would open, the consequent loss of voltage at the input to switch 17 closing that switch, the resulting over-current through the switch assembly 17 resulting in the opening of the interrupter 25. Thus, load sections 1 and 2 would be normally fed by the feeder cable 12; and faulted section 3 is isolated from the network.

Adherence to the previously described sequence of operation requires time coordination between the load break switches. Consequently, and under control of the respective control networks 31, 33, and 35, the load break switch 22 is switched essentially instantaneously upon loss of voltage thereto; the load break switch 20 operates at a somewhat slower response time; and the load break switch 17 has the slowest switching response time. Additionally, the vacuum interrupter 21 has a slower switching (opening) response time than that of the circuit breaker 14; the interrupters 23 and 25, particularly interrupter 25, having an extremely fast response time.

A summary of the above described operation appears in Table I below:

TABLE I

|  | Breaker 14(14a) | Switch 20(20') | Int. 21(21') | Switch 22(22') | Int. 23(23') | Switch 24 | Int. 25 |
|---|---|---|---|---|---|---|---|
| Normal Operation | closed | X position | closed | closed | closed | open | closed |
| Load 1(1') Fault | open | Y position | closed | open | closed | closed | closed |
| Load 2(2') Fault | closed | X position | open | open | closed | closed | closed |
| Load 3(3') Fault | closed | X position | closed | closed | open | closed | open |

Figure 2:
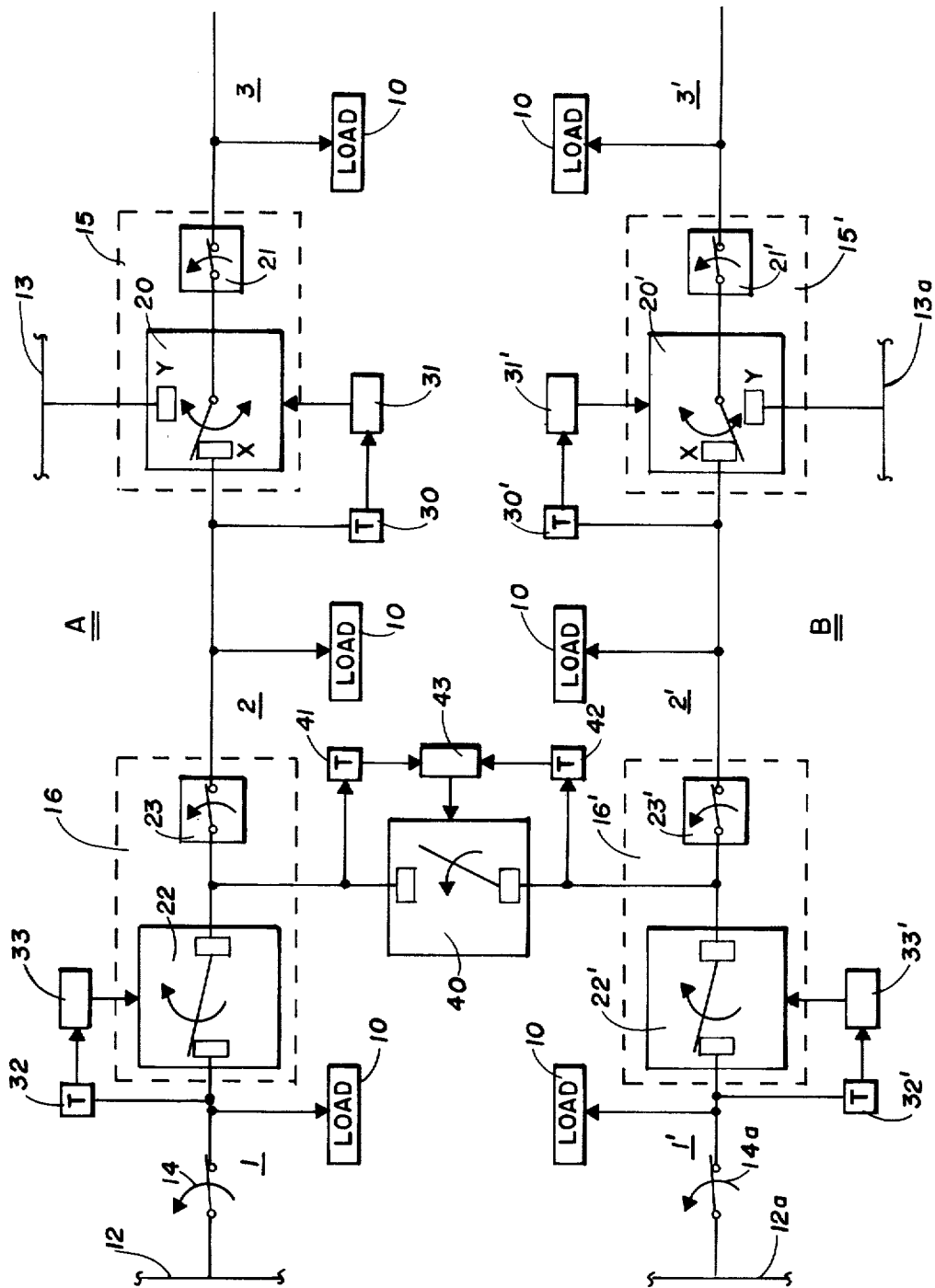
FIG. 2 is a block diagram of an alternate embodiment of an electrical power distribution system incorporating the principles of the present invention.

During normal operation (absence of any load faults) circuit breaker 14, vacuum interrupters 21, 23 and 25, and load break switch 22 are all closed; load break switch 24 is open; and load break switch 20 is in the X Referring now to FIG. 2, there is depicted an alternate embodiment of a high voltage electrical power distribution network incorporating the principles of the present invention. Accordingly, the switching systems 15 and 16 (15' and 16') and their associated sensing and control networks have a construction and operation identical to that previously described with reference to FIG. 1. In this embodiment, however, the switching system 16 (16') is disposed between the load sections 1 (1') and 2 (2'); while the switching system 15 (15') is disposed between the load sections 2 (2') and 3 (3'), the auxiliary feeders 13 and 13a being connected with the Y terminals as previously described. Furthermore, the branches A and B are now adapted to be electrically connected by a normally open load break switch 40 having its terminals connected intermediate the switches 22 and 23 and 22' and 23'. Voltage transformers 41 and 42 have their inputs respectively coupled to the terminals of the switch 40 and their outputs coupled to a control network 43 for effecting the switching operation of the load break switch 40, in accordance with the subsequently described operation.

In accordance with the operation of the embodiment depicted in FIG. 2, each of the switches are in the positions illustrated in FIG. 2 during normal operating conditions (absence of any load faults); the load sections 1, 2, and 3 ( and 1', 2', and 3') being furnished power from the primary feeders 12 (and 12a).

Assuming now that a fault occurs at the load section 1, the resulting over-current will open station circuit breaker 14, resulting in a loss of voltage at the load break switches 22, 20 and 40. This loss of voltage, sensed by the respective voltage transformers associated therewith, results in the switch 22 being opened; switch 40 being closed; and the load break switch 20 (switch contact) being switched to the Y terminal position. As a consequence of this switching operation, the load section 2 is being furnished power from the feeder cable 12a; load section 3 is being furnished power from the feeder cable 13; and the faulted load section 1 is isolated from the remainder of the network.

On the other hand, if during normal operation a fault occurred at the load section 2, the resulting over-current would open interrupting switch 23, the resulting loss of voltage to the load break switch 20 causing the switch to be transferred to the Y terminal position. Thus, load section 1 would be fed from primary feeder 12; load section 3 would be fed from auxiliary feeder 13; and faulted load section 2 would be isolated.

And finally, assuming that a fault occurred in load section 3 during normal operation, the resulting over-current would open the interrupter 21, the remaining switches and interrupters being maintained in their "normal" positions illustrated in FIG. 2. Thus, load sections 1 and 2 would be supplied power from the primary feeder 12; and load section 3 would be isolated.

The switching sequences in the event of load faults occurring in load sections 1', 2', and 3' would be identical to that previously described for load sections 1, 2, and 3. A summary of the sequence of operation then appears in Table II below:

TABLE II

|  | Breaker 14(14a) | Switch 22(22') | Int. 23(23') | Switch 20(20') | Int. 21(21') | Switch 40 |
|---|---|---|---|---|---|---|
| Normal Operation Load 1(1') | closed | closed | closed | X position | closed | open |
| Fault Load 2(2') | open | open | closed | Y position | closed | closed |
| Fault Load 3(3') | closed | closed | open | Y position | closed | open |
| Fault | closed | closed | closed | X position | open | open |

Figure 3:
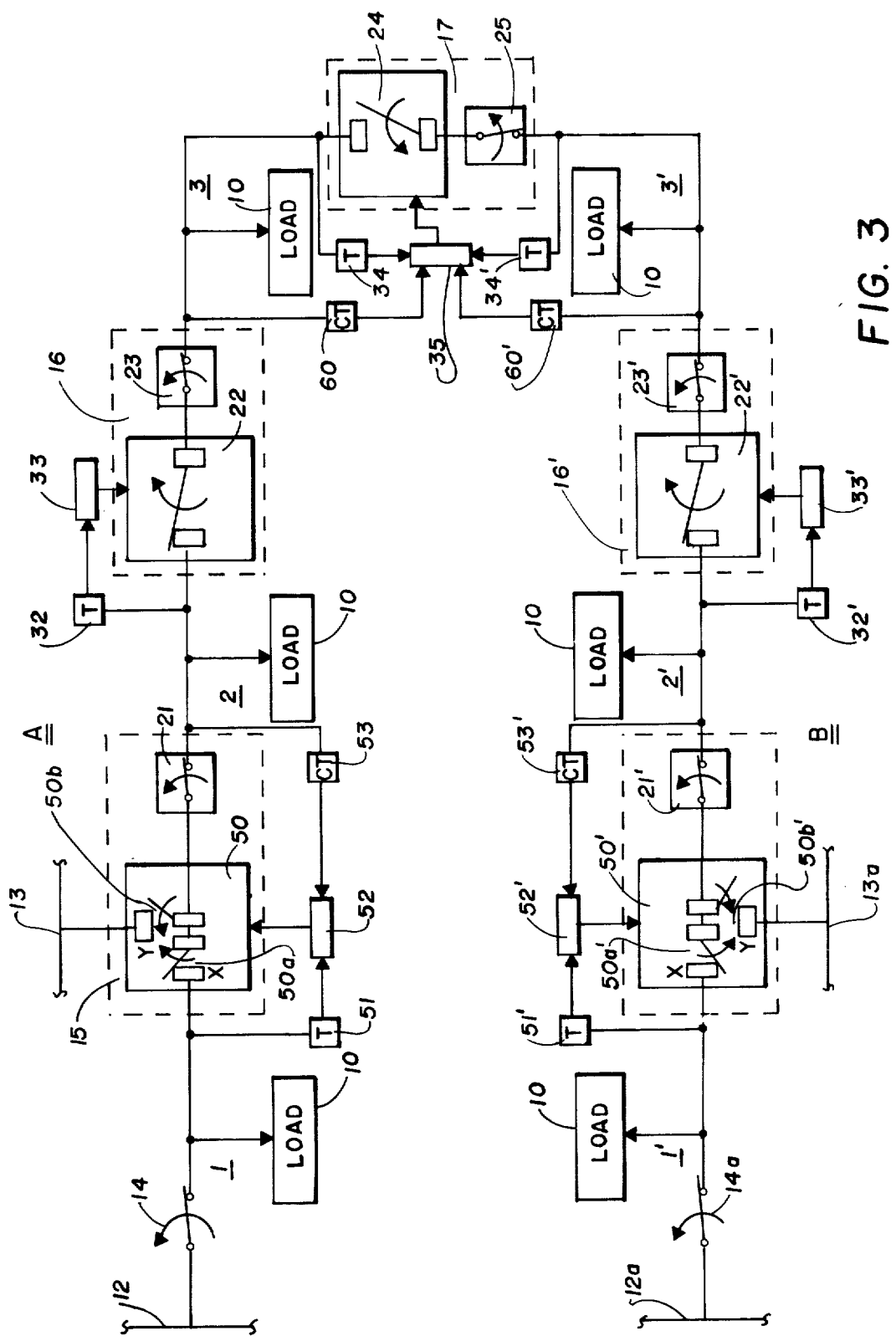
FIG. 3 is a block diagram of another alternate embodiment of an electrical power distribution system incorporating the principles of the present invention.

Referring now to FIG. 3, a third embodiment of an electrical power distribution network incorporating the principles of the present invention is depicted. Accordingly, the switching system 15 (15') disposed between the load sections 1 and 2 (1' and 2') comprises load break switch means 50 (50') in series with the interrupter switch 21 (21'). The switch means 50 essentially comprises two interconnected load break switches 50a and 50b, the switch 50a being normally closed, and the switch 50b being normally open.

The entire switching means 50 is responsively switched between an X position (switch contact of 50a being in contact with the X terminal) under normal operating conditions; a Y position (switch contact of 50b in contact with the Y terminal) upon loss of voltage at its input; and an "open" position (switch contacts of 50a and 50b being out of contact with both the X and Y terminals) upon the simultaneous loss of voltage at its input and the presence of an excessive or fault current at load section 2.

Loss of voltage at the input to switch 50 is sensed by the voltage transformer 51; the excessive or over-current condition is sensed by a current transformer 53, the outputs of both being coupled to a control network 52 for effecting the just described switching operation. A similar description, of course, would apply to switch apparatus 50'.

The switching system 16 has the same construction and operation as that previously described with reference to FIG. 1. Similarly, the switching system 17 and associated voltage sensing transformers 34 and 34' have the same construction and operation as that previously described. In addition, however, current transformers 60 and 60' are in respective electrical communication with the outputs of switching systems 16 and 16' and the control network 35, as depicted in FIG. 3. Under control of the network 35, the normally open load break switch 24 will be closed upon a loss of voltage sensed by either of the voltage transformers 34 or 34' except when fault current in load section 3 (or 3') is present, which fault current is sensed by the current transformers 60 or 60'. In that case, the load break switch 24 is maintained or locked in its open position.

In accordance with another unique feature of this embodiment, the circuit breaker 14 (14a) is adapted to initially open upon the occurrence of fault current at any one of the load sections 1, 2, or 3 (1', 2', or 3') and is thereafter reclosed for a prescribed period of time (by a separate timing mechanism not shown). If the fault current persists beyond this prescribed period of time, the breaker consequently reopens and is subsequently closed again. If excessive fault current still persists (as would be the case in the event of a regular fault in load section 1), the breaker opens and is locked in that open position until correction of the fault. Thus, upon the occurrence of a temporary fault (less than the prescribed period of time), the control mechanisms associated with the load break switches prevent their switching; and the subsequent closing of the circuit breaker 14 (and 14a) will restore normal service and avoid the transfer operations.

There is now described the overall operation of the distribution network depicted in FIG. 3. As before, the following operating sequence will be referenced to faults occurring within the various load sections associated with the branch A, it being understood that a similar operating sequence would occur for load faults in corresponding load sections of branch B.

During normal operation (absence of any load faults) circuit breaker 14, vacuum interrupters 21, 23, and 25 and load break switch 22 are closed; load break switch 24 is open; and load break switch 50 is in the X position. The corresponding switches in branch B would, of course, be in the same position. Thus, power to all the load sections 1, 2, and 3 is being supplied from the primary feeder 12.

Assume now that a fault occurs at the load section 1. As a consequence thereof, the station circuit breaker 14 will open for an initial period of time, for example ten seconds; and then reclose. If the fault at load section 1 was a short-term fault and had cleared itself during this first ten second interval, no switching action will occur and the network remains in its normal operating condition previously described. On the other hand, if the fault in load section 1 persists, the circuit breaker 14 will reopen and remain open, resulting in a consequent loss of voltage at the inputs to load break switches 50, 22, and 17. As a consequence, the load break switch 50a (switch contact) would open; load break switch 50b (switch contact) would be switched to the Y terminal; and the switch apparatus 50 would be in the Y position. Additionally, load break switch 22 opens; and load break switch 24 closes. Thus, the load section 2 is now coupled to, and furnished power from, the auxiliary feeder cable 13; load section 3 is coupled to, and furnished power from, the feeder cable 12a; and faulted load section 1 has been isolated or sectionalized from the remainder of the network.

On the other hand, assume that the load fault initially occurred at the load section 2. As before, the circuit breaker 14 will go through an initial open-close cycle; and if the fault at load section 2 has cleared during that period, the network remains in the normal operating condition. On the other hand, if the load fault at load section 2 persists, the circuit breaker 14 will reopen resulting in a consequent loss of voltage at the inputs to load break switches 50, 22, and 17. Due to the presence of the fault current which is sensed by the current transformer 53, however, both switch contacts of the switches 50a and 50b are opened and the switching apparatus 50 is in its "open" condition. Load break switch 22 would open; and load break switch 24 would close. The station circuit breaker 14 would then reclose, restoring service to load section 1 from feeder cable 12; load section 3 would be fed from feeder cable 12a; and faulted section 2 would be isolated.

And finally, assuming that a fault occurs at load section 3, and is not cleared prior to the initial reclosing of the circuit breaker 14, as previously described, the following sequence of events take place: the interrupter switch 23 is opened and the fault current is sensed by the current transformer 60 to lock the load break switch 24 in its open position. Load break switch 50 remains in its X position; and load break switch 22 remains in its closed position. Thus, upon reclosing of the circuit breaker 14, load sections 1 and 2 would be furnished power from the primary feeder 12; and load section 3 would be isolated.

A summary of the above described operation appears in Table III below:

TABLE III

|  | Breaker 14(14a) | Switch 50(50') | Int. 21(21') | Switch 22(22') | Int. 23(23') | Switch 24 | Int. 25 |
|---|---|---|---|---|---|---|---|
| Normal Operation | closed | X position | closed | closed | closed | open | closed |
| Load 1(1') Fault short term regular | opens/ closes open | X position Y position | closed closed | closed open | closed closed | open closed | closed closed |
| Load 2(2') Fault short term regular | opens/ closes closed | X position open | closed open | closed open | closed closed | open closed | closed closed |
| Load 3(3') Fault short term regular | opens/ closes closed | X position X position | closed closed | closed closed | closed open | open open | closed closed |

Various other modifications of the disclosed embodiments, as well as other embodiments of the invention, may become apparent to persons skilled in the art without departing from the spirit and scope of the invention as defined by the appended claims.

What is claimed is:

1. An alternating current high voltage electrical power distribution network, comprising:

a. a pair of load branches, each branch having first, second and third load section means coupled thereto at spaced locations therealong;

b. a first switching system connecting said first and second load section means; a second switching system connecting said second and third load means; and a third switching system connecting the third load means of each of said pair of load branches with one another;

c. said first switching system comprising first and second series connected switches; the first of said switches having an input, output, and an intermediate terminal, the input terminal connected with said first load section means and the output terminal connected with said second switch, and a switch contactor adapted to transfer the said output terminal from electrical connection with said input terminal to electrical connection with said intermediate terminal in response to a loss of voltage at said input terminal; said second switch being normally closed and adapted to open in response to excessive current therethrough;

said second switching system comprising first and second series connected switches, the first of said switches having its input connected to said second load section means and adapted to open in response to a loss of voltage at its said input, the second of said switches being normally closed and adapted to open in response to excessive current therethrough;

said third switching system comprising first and second series connected switches, the first of said switches being normally open and adapted to close in response to a loss of voltage at either the input or the output of said third switching system, the second of said switches being normally closed and adapted to open in response to excessive current therethrough;

a pair of power sources respectively coupled to each of said branches for providing, during absence of faults in any of said load section means, a preferred source of electrical power to the first, second and third load means of each branch; and auxiliary power sources respectively connected to the intermediate terminal of the first switch of each of said first switching systems;

said first, second and third switching systems being responsive to faults occurring in any of the first, second and third load section means for isolating the faulted load means while transferring or maintaining the remaining non-faulted load section means in communication with either said preferred sources of power or said auxiliary sources of power.

An alternating current high voltage electrical ver distribution network, comprising:

a pair of load branches, each branch having first, second and third load section means coupled thereto at spaced locations therealong;

a first switching system in each of said branches connecting said first and second load section means; a second switching system in each of said branches connecting said second and third load means; and a third switching system connected with the first switching system of each load branch;

said first switching system comprising first and second series connected switches, the first of said series connected switches having its input connected to said first load section means and adapted to open in response to a loss of voltage at its said input, the second of said series connected switches being normally closed and adapted to open in response to excessive current therethrough;

said second switching system comprising first and second series connected switches; the first of said switches having an input, output, and an intermediate terminal, the input terminal connected with said second load section means and the output terminal connected with said second switch of said second switching system, and a switch contactor adapted to transfer the said output terminal from electrical connection with said input terminal to electrical connection with said intermediate terminal in response to a loss of voltage at said input terminal; said second switch of said second switching system being normally closed and adapted to open in response to excessive current therethrough;

e. said third switching system comprising a normally open switch adapted to close in response to a loss of voltage at either the input or the output of said third switching system;

f. a pair of power sources respectively coupled to each of said load branches for providing, during absence of faults in any of said load section means, a preferred source of electrical power to the first, second, and third load section means of each load branch; and g. auxiliary power sources respectively connected to the intermediate terminal of the first switch of each of said second switching systems;

h. said first, second and third switching systems being responsive to faults occurring in any of the first, second and third load section means for isolating the faulted load section means while transferring or maintaining the remaining nonfaulted load section means in communication with either said preferred sources of power or said auxiliary sources of power.

3. An alternating current high voltage electrical power distribution network, comprising:

a. a pair of load branches, each branch having first, second and third load section means coupled thereto at spaced locations therealong;

b. a first switching system in each of said load branches connecting said first and second load section means; a second switching system in each of said load branches connecting said second and third load means; and a third switching system connecting the third load means of each of said pair of load branches with one another;

c. said first switching system comprising first and second series connected switches, the first of said series connected switches having an input, output, and an intermediate terminal, the input terminal connected with said first load section means and the output terminal connected with said second series connected switch, said first switch adapted to responsively transfer the said output terminal into electrical connection with said intermediate terminal in response to a loss of voltage at said input terminal and to be opened in response to the simultaneous loss of voltage at its said input terminal and the presence of a fault occurring in said second load section means; the second of said series connected switches being normally closed and adapted to open in response to excessive current therethrough;

d. said second switching system comprising first and second series connected switches, the first of said switches of said second switching system having its input connected to said second load section means and adapted to open in response to a loss of voltage at its said input, the second of said switches of said second switching system being normally closed and adapted to open in response to excessive current therethrough;

e. said third switching system comprising first and second series connected switches, the first of said switches of said third switching system being normally open and adapted to close in response to a loss of voltage at either the input or the output of said third switching system, the second of said switches of said third switching system being normally closed and adapted to open in response to excessive current therethrough, and means for preventing the first of said switches in said third switching system from closing when a fault is present in either the third load means of said first load branch or the third load means of said second load branch;

f. a pair of power sources respectively coupled to each of said load branches for providing, during absence of faults in any of said load section means, a preferred source of electrical power to the first, second and third load section means of each brand; and g. auxiliary power sources respectively connected to the intermediate terminal of the first switch of each of said first switching systems;

h. said first, second and third switching systems being responsive to faults occurring in any of the first, second and third load section means for isolating the faulted load section means while transferring or maintaining the remaining nonfaulted load section means in communication with either said preferred sources of power or said auxiliary sources of power.

* * * * *